United States Patent
Tejada et al.

(10) Patent No.: US 7,280,273 B2
(45) Date of Patent: Oct. 9, 2007

(54) METHOD AND SYSTEM FOR SIMULTANEOUSLY IMAGING IN THE NEAR INFRARED AND SHORT WAVE INFRARED SPECTRUMS

(75) Inventors: John Tejada, Londonderry, NH (US); William Weidner, Dublin, NH (US)

(73) Assignee: Janos Technology Inc., Keene, NH (US)

( * ) Notice: Subject to any disclaimer, the term of this patent is extended or adjusted under 35 U.S.C. 154(b) by 20 days.

(21) Appl. No.: 11/346,943

(22) Filed: Feb. 3, 2006

(65) Prior Publication Data

US 2007/0195403 A1 Aug. 23, 2007

(51) Int. Cl.
G02B 13/14 (2006.01)

(52) U.S. Cl. ............... 359/356; 359/355; 359/357; 359/656

(58) Field of Classification Search ............... None
See application file for complete search history.

(56) References Cited

U.S. PATENT DOCUMENTS

| | | | | |
|---|---|---|---|---|
| 5,021,657 A | * | 6/1991 | Kettlewell et al. | 250/330 |
| 5,909,308 A | * | 6/1999 | Ulrich | 359/357 |
| 6,208,459 B1 | | 3/2001 | Coon et al. | |
| 6,423,969 B1 | * | 7/2002 | Amon | 250/339.01 |
| 2005/0243411 A1 | * | 11/2005 | Cook | 359/363 |

OTHER PUBLICATIONS

Schott Material Safety Data Sheet, Product name: NFK-51, Feb. 20, 2001 (1 page).
Schott Optical Glass Property Data Sheet, Product name: N-FK51, Aug. 16, 2004 (1 page).
Schott Material Safety Data Sheet, Product name: N-LAK-21, Feb. 19, 2001 (1 page).
Schott Optical Glass Property Data Sheet, Product name: N-LAK21, May 18, 2000 (1 page).

* cited by examiner

Primary Examiner—Stephone B. Allen
Assistant Examiner—Derek S. Chapel
(74) Attorney, Agent, or Firm—Grossman, Tucker, Perreault & Pfleger, PLLC

(57) ABSTRACT

An image forming system and lens system configured to simultaneously image light at the short wave infrared region (SWIR) and the near infrared region (NIR).

18 Claims, 3 Drawing Sheets

METHOD AND SYSTEM FOR SIMULTANEOUSLY IMAGING IN THE NEAR INFRARED AND SHORT WAVE INFRARED SPECTRUMS

TECHNICAL FIELD

The present application generally relates to imaging devices and, more specifically, system and method for simultaneously imaging in the near infrared region and the short wave infrared region.

BACKGROUND

Many imaging applications, such as military, biomedical, telescopes, reconnaissance planes, satellites, forward-looking infrared, staring sensor systems, night-vision goggles, and other optic and/or electro-optic detection systems demand detection in both the near infrared region (NIR) and the short wave infrared region (SWIR). Traditionally, imaging in both of these regions required separate refractive lens systems with separate associated detectors, or reflective systems including multiple mirror reflectors. Reflective systems have suffered from a narrow field of view, thus leading to a preference for refractive systems.

More recently, detectors capable of gathering information in more than one spectral band have emerged. Systems including multi-band detectors have incorporated separate refractive lens systems associated with each of the separate wavelength bands for focusing energy in the separate bands onto the detector. Providing a separate lens system for each band can add to system size, weight, cost and complexity.

Therefore, there is a need for a method and system for simultaneously imaging in the near infrared and the short wave infrared spectrums without refocusing.

BRIEF DESCRIPTION OF THE DRAWINGS

So the manner in which the above recited features of the present invention can be understood in detail, a more particular description of the invention may be had by reference to the embodiments, some of which are illustrated in the appended drawings. It is to be noted, however, that the appended drawings illustrate only typical embodiments of this invention and are therefore not to be considered limiting of its scope, for the invention may admit to other equally effective embodiments. Moreover, it should be appreciated that the specific materials, lens formulations and systems applications disclosed herein are merely illustrative and do not delimit the scope of the invention.

DETAILED DESCRIPTION

Figure 1:
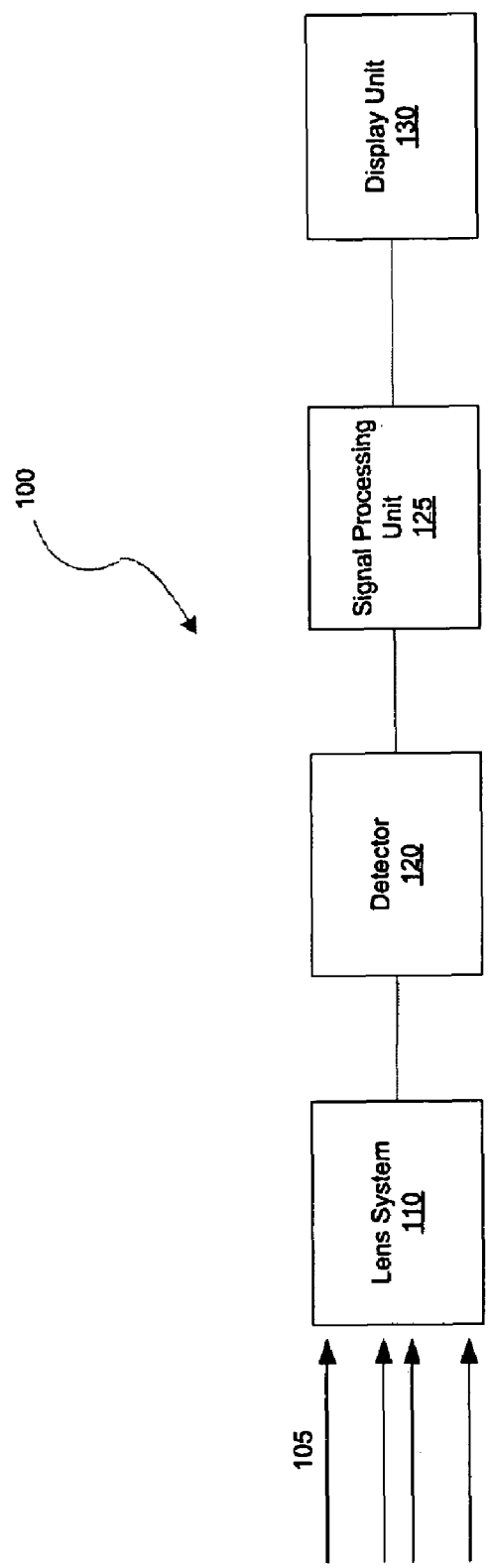
FIG. 1 is a schematic diagram of an exemplary embodiment of an image forming system consistent with the present invention.

FIG. 1 is a simplified block diagram of one exemplary embodiment of an image forming system 100 consistent with the present invention. The illustrated exemplary system 100 includes a lens system 110, a detector 120, a signal processing unit 125, and a display unit 130. Collimated light imparted on the lens system 110 may be detected by detector 120. In general the detector 120 converts the light imparted thereon to electrical impulses. A variety of detector configurations are well-known to those of ordinary skill in the art. In one embodiment, for example, the detector 210 may be configured as a microbolometer.

The electric impulses provided by the detector 120 may be coupled to the signal processing unit 125. In a known manner, the signal processing unit 125 may translate the electrical impulses into data representative of an image(s) of objects that generated or reflected the light received at the lens 110. The data may be coupled to the display unit, which displays the image(s).

In one embodiment, the system 100 may be configured for simultaneously imaging light from the NIR and SWIR bands onto a common focal plane. As used herein the "SWIR" band or spectrum shall refer to wavelengths from about 1.25 to about 2.5 micrometers, and the "NIR" spectrum or band shall refer to wavelengths from about 750 to about 950 micrometers. Imaging multiple wavelength bands onto a common focal plane allows use of a single detector and avoids the need to refocus when imaging light from one band to the other. Such a system may be useful, for example, in providing combined thermal and night vision imaging.

Consistent with the present invention, achromatic imaging in these bands onto a common focal plane may achieved through use of a combination, in any order, of a barium fluoride $BaF_2$ lens element, a Schott NFK51 optical glass lens element, and a Schott NLAK21 optical glass lens element. The combined characteristics of $BaF_2$, NFK51 and NLAK21 lens elements from about 1.25 to about 2.5 micrometers and about 750 to about 950 micrometers, establish an achromatic condition that is believed to be superior to other combinations of lens material.

The $BaF_2$ lens element may be characterized by a refractive index ranging from 1.465871 to 1.470400 for wavelengths from 1.6 to 0.8 micrometers. For this range of wavelengths the $BaF_2$ lens element may have an Abbe number, $V=(n_{center\ wavelength}-1)/n_{low\ wavelength}-n_{high\ wavlength})=103.2$. $BaF_2$ lens elements exhibiting such characteristics are commercially available from Janos Technology Inc.

Schott NFK51 (sometimes described as N-FK51 or N-FK-51 and other variants) and NLAK21 (sometimes described as N-LAK-21, NLAK-21 or N-LAK21 and other variants) optical glasses are available from Schott North America, Inc of Duryea, Pa. (herein referred to as "Schott"). The NFK51 optical glass is characterized by Schott as exhibiting a d-line (587.56 nm) index of refraction $n_d=1.48656$ and an associated Abbe number, $V_d=(n_d-1)/(n_f-n_c)=84.47$, wherein $n_f$ is the f-line (486.1 nm) index of refraction and $n_c$ is the c-line (656.3 nm) index of refraction. The NLAK21 optical glass is characterized by Schott as exhibiting a d-line index of refraction $n_d=1.64049$ and an associated Abbe number, $V_d=60.1$. According to the Schott glass catalog the indices of refraction are accurate to at least ±0.0005 and the Abbe numbers are accurate to at least ±0.8%. Thus the NFK51 optical glass may exhibit an index of refraction of about 1.48606 to 1.48706 an Abbe number of about 83.79424 to 85.14576, while the NLAK 21 optical glass may exhibit an index of refraction of about 1.63999 to 1.64099 and an Abbe number of about 59.6192 to 60.5808.

Although the invention may be described herein with respect to NFK51 and NLAK21 Schott glasses, it is to be understood other materials having comparable characteristics may be used. For example, an S-BSM81 optical glass from Ohara or an LAC641601B optical glass from Pilkington may be an appropriate substitute for a Schott N-LAK-21 optical glass. In general, where other materials, are used, the refractive index $n_d$ and Abbe number $V_d$ should vary by, at most, ±0.8% from those of the NFK51 and NLAK21 Schott glasses.

Figure 2:
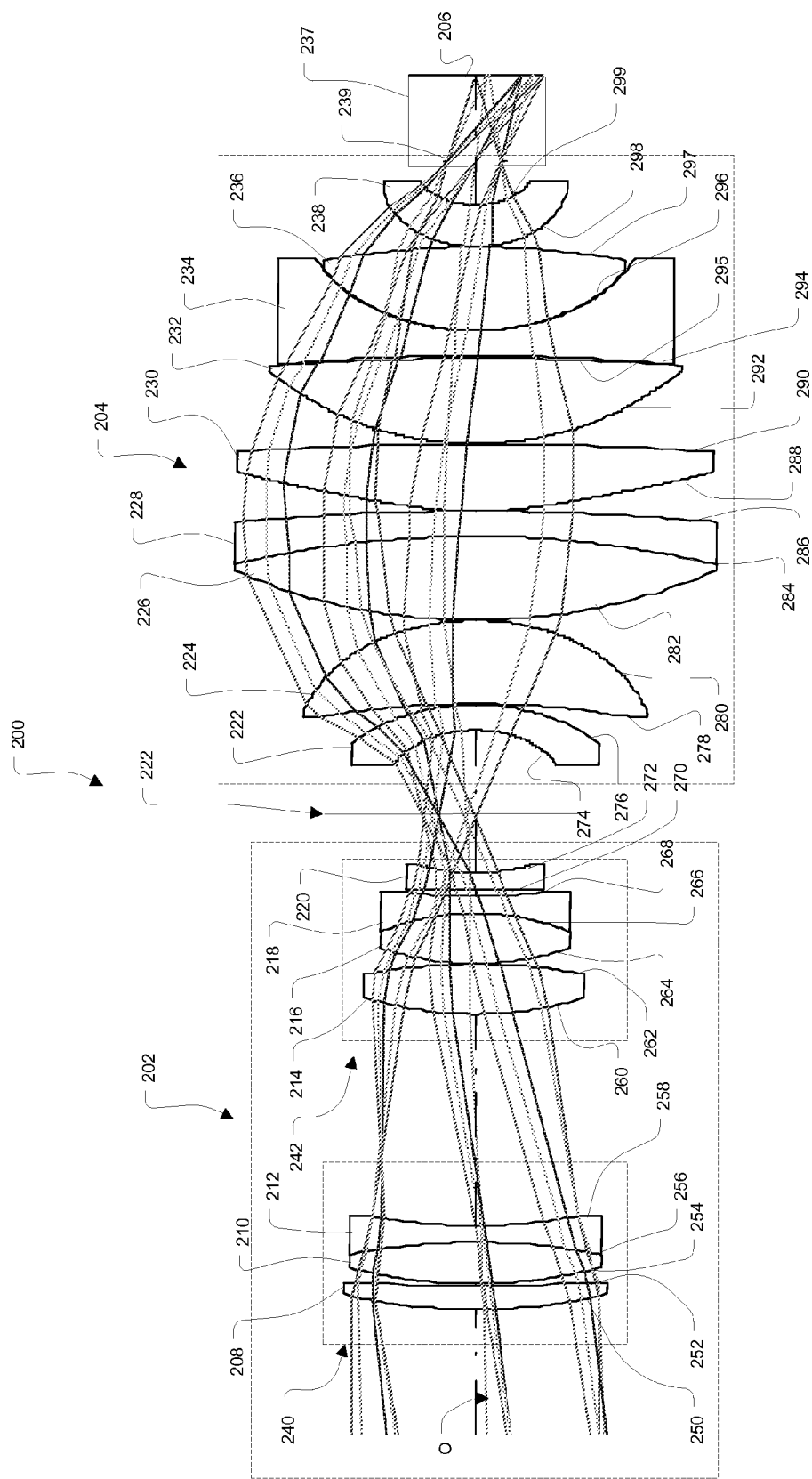
FIG. 2 is a schematic diagram of one exemplary embodiment of a lens system consistent with the present invention.

FIG. 2 illustrates one exemplary embodiment 200 of at least a portion of a lens system 110 consistent with the present invention. The illustrated exemplary lens includes an objective lens unit 202 and a relay lens unit 204, and may be used to simultaneously image light in the NIR and SWIR bands onto a common focal or imaging plane 206.

The objective lens unit 202 may be in the form of a Petzval lens configured to form an intermediate image at plane 222. The objective lens unit 202 may include first through seventh lens elements 208, 210, 212, 214, 216, 218, and 220 disposed along a common optical axis O. The first lens element 208 may be made of NFK51 Schott glass. In a first doublet, the second lens element 210 is made of NFK51 and the third lens element 212 is made of NLAK21 Schott glass. The forth lens element 214 is made of NFK51, and, in a second doublet, the fifth lens element 216 is made of NFK51 and the sixth lens element is made of NLAK21. The seventh lens 218 element is made of an acrylic material.

The relay lens unit 204 is configured to focus light from the intermediate plane 222 to a common imaging plane 206, e.g. a detector focal plane array, and includes eighth through sixteenth lens elements disposed on the optical axis O. The eighth lens element 222 is made of selenide (ZnSe), and the ninth lens element 224 is made of $BaF_2$. In a third doublet, the tenth lens element 226 is made of NFK51 and the eleventh lens element 228 is made of NLAK21. The twelfth 230 and thirteenth 232 lens elements are made of $BaF_2$, and, in a fourth doublet, the fourteenth lens element 234 is made of NFK51 and the fifteenth lens element 236 is made of NLAK21. The sixteenth lens element 238 is made of $BaF_2$.

In the illustrated exemplary embodiment, a dewar 237 incorporating a cold shield 239 is provided. As is known to those of ordinary skill in the art, a dewar may be configured as a vacuum bottle cooled to cryogenic temperature using liquid nitrogen. A dewar is useful in thermal imaging applications for attenuating energy emanating from sources other than a scene under view. If a detector 120 is allowed to detect thermal energy other than the energy emanating from the scene under view, then the sensitivity is reduced. Moreover, if the magnitude of the sources other than an object being viewed changes or modulates over the field of view, then there is a reduction in the quality of the multi-spectral image.

The cold shield 239 includes an aperture providing 100% cold shield efficiency. A system may be considered 100% cold shield efficient when detector 120 can record energy only from an object being viewed. Cold shield efficiency is thus defined as the ratio of the total solid angle reaching a given pixel of the detector which comes from the scene to the total solid angle reaching the same pixel from the aperture in the cold shield.

The lens system 110 provides a super-achromatic condition from about 1.25 to about 2.5 micrometers and about 750 to about 950 micrometers spectral range. The prescription for the exemplary embodiment 200 is compiled in Table 1 below, with reference to the surface numbers shown in FIG. 2. All of the surfaces are spherical except as otherwise indicated. Aspheric surfaces are defined herein by the sag, Z, given by $$Z = \frac{cr^2}{1 + \sqrt{1 - (1+k)c^2r^2}} + Ar^4 + Br^6 + Cr^8 + Dr^{10} + Er^{12} \quad \text{(Equation 1)}$$

wherein c is the base curvature of at the vertex, k is a conic constant, r is the radial coordinate measured perpendicularly from the optical axis, and A, B, C, D and E are higher order aspheric constants.

Also, in the example of Table 1 the effective focal length is 120 mm, the f-number (F/#) is 2.3529, and the field of view half angle is 6.5 degrees. The index of refraction for $BaF_2$ material ranges from 1.465871 to 1.470400 for wavelengths between 1.6 to 0.8 micrometers. The index of refraction for ZnSe material ranges from 2.454209 to 2.524175 for wavelengths between 1.6 to 0.8 micrometers. ZnSe lens elements exhibiting such characteristics are commercially available from Janos Technology Inc. The index of refraction for NFK51 material ranges from 1.475572 to 1.482315 for wavelengths between 1.6 to 0.8 micrometers. The index of refraction for acrylic material ranges from 1.476878 to 1.484777 for wavelengths between 1.6 to 0.8 micrometers. Acrylic lens elements exhibiting such characteristics are commercially available from Polymer Optics LLC. The index of refraction for NLAK21 material ranges from 1.618331 to 1.632494 for wavelengths between 1.6 to 0.8 micrometers. The index of refraction for NFK51 material ranges from 1.475572 to 1.482315 for wavelengths between 1.6 to 0.8 micrometers.

TABLE 1

| Surface | Radius (mm) | Thickness (mm) | Lens Material | K | A | B | C | D | E |
|---|---|---|---|---|---|---|---|---|---|
| 250 | 82.66459 | 7.5 | NFK51 | | | | | | |
| 252 | 703.65665 | 0.25 | | | | | | | |
| 254 | 69.46485 | 12.5 | NFK51 | | | | | | |
| 256 | −94.88432 | 5 | NLAK21 | | | | | | |
| 258 | 82.78388 | 63.299205 | | | | | | | |
| 260 | 52.51724 | 15 | NFK51 | | | | | | |
| 262 | −93.53774 | 0.25 | | | | | | | |
| 264 | 43.22418 | 15 | NFK51 | | | | | | |
| 266 | −37.85638 | 5 | NLAK21 | | | | | | |
| 268 | 74.18870 | 2.233996 | | | | | | | |
| 270 | −178.95198 | 5 | Acrylic | | | | | | |
| 272 | 33.12131 | 42.721936 | | 0 | 3.93703E−06 | 2.87907E−08 | 1.44019E−10 | 0 | 0 |
| 274 | −19.53846 | 7.5 | ZnSe | 0 | 9.43404E−07 | 1.05747E−09 | −1.08392E−10 | 6.48857E−13 | −2.03908E−15 |
| 276 | −34.69585 | 0.25 | | 0 | | | | | |
| 278 | −139.40477 | 25 | $BaF_2$ | | | | | | |
| 280 | −39.26892 | 0.25 | | | −1.27259E−06 | −4.78336E−10 | 7.24039E−13 | −8.12361E−16 | 0 |

TABLE 1-continued

| Surface | Radius (mm) | Thickness (mm) | Lens Material | K | A | B | C | D | E |
|---|---|---|---|---|---|---|---|---|---|
| 282 | 91.31466 | 25 | NFK51 | 0 | | | | | |
| 284 | −155.54308 | 7.5 | NLAK21 | | | | | | |
| 286 | −396.35043 | 0.1 | | | | | | | |
| 288 | 60.5487 | 20 | BaF$_2$ | | −3.63651E−06 | 7.95278E−10 | −4.49045E−14 | −2.53396E−17 | 0 |
| 290 | −548.43650 | 0.25 | | | | | | | |
| 292 | 54.39182 | 25.547062 | BaF$_2$ | 0 | 1.222788E−06 | −6.30087E−11 | −2.81946E−13 | −1.96839E−18 | 0 |
| 294 | −416.61537 | 0.75 | | | | | | | |
| 295 | −330.97921 | 7.5 | NLAK21 | | | | | | |
| 296 | 36.37794 | 25 | NFK51 | | | | | | |
| 297 | −127.76831 | 0.25 | | | | | | | |
| 298 | 19.2955 | 12.5 | BaF$_2$ | | | | | | |
| 299 | 13.95349 | 13.11977 | | 0 | 2.22071E−05 | 8.95380E−08 | 1.55965E−09 | −1.41026E−11 | 9.37683E−14 |

Figure 3:
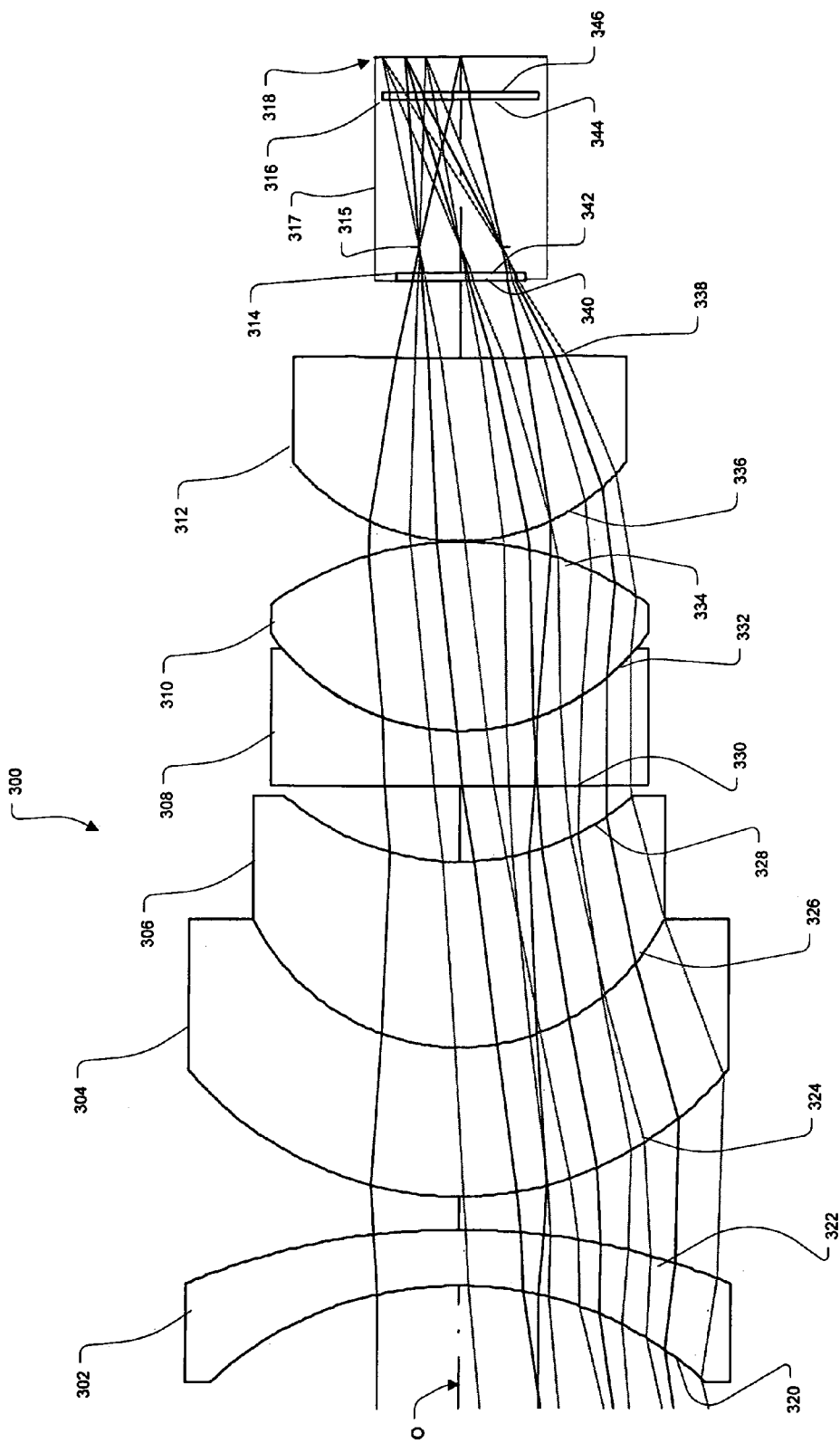
FIG. 3 is a schematic diagram of another exemplary embodiment of a lens system consistent with the present invention.

FIG. 3 illustrates another embodiment 300 of at least a portion of a lens system 110 configured to simultaneously image light from the NIR and SWIR bands onto a common focal plane 318. The embodiment 300 is arranged in an inverse telephoto configuration, and includes first through eighth lens elements 302, 304, 306, 308, 310, 312, 314, and 316 disposed along a common optical axis O. The first lens element 302 may be made of NFK51 Schott glass. In a first doublet, the second lens element 304 is made of NFK51 and the third lens element 306 is made of NLAK21 Schott glass, and, in a second doublet the fourth lens element 308 is made of NFK51 and the fifth lens element 310 is made of NLAK21. The sixth lens element 312 is made of BaF$_2$.

A dewar 317 including a dewar window 314, a cold shield 315 and a cold filter 316 may be provided. The dewar window 314 and the cold filter 316 may be made of ZnSe. In one embodiment the cold shield 315 may allow for 100% cold-shielding efficiency.

The prescription for the exemplary embodiment 300 is compiled in Table 2 below, with referenced to the surface numbers identified in FIG. 3. In this example, the effective focal length is 50 mm, the f-number (F/#) is 2.3, and the field of view half angle is 12.986 degrees. The index of refraction for BaF$_2$ material ranges from 1.464280 to 1.469349 for wavelengths between 2.1 to 0.9 micrometers. The index of refraction for ZnSe material ranges from 2.444914 to 2.503382 for wavelengths between 2.1 to 0.9 micrometers. The index of refraction for NLAK21 material ranges from 1.611947 to 1.630421 for wavelengths between 2.1 to 0.9 micrometers. The index of refraction for FK51 material ranges from 1.471619 to 1.481105 for wavelengths between 2.1 to 0.9 micrometers.

There is thus provided, according to one aspect of the present invention, a lens system including a first lens element having an associated Abbe number $V_d$ of about 83.79424 to 85.14576; a second lens element having an associated Abbe number $V_d$ of about 59.6192 to 60.5808; and a third lens element made of Barium Fluoride, wherein the lens elements are configured to simultaneously image light in a wavelength range from about 1.25 to about 2.5 micrometers and light in a wavelength range from about 750 to about 950 micrometers at a common focal plane.

According to another aspect of the invention, there is provide a system including: a plurality of lenses including at least a first lens element having an associated Abbe number $V_d$ of about 83.79424 to 85.14576, a second lens element having an associated Abbe number $V_d$ of about 59.6192 to 60.5808, and a third lens element made of Barium Fluoride, the plurality of lenses configured to simultaneously image light in a wavelength range from about 1.25 to about 2.5 micrometers and light in a wavelength range from about 750 to about 950 micrometers at a common focal plane; a detector positioned at the common focal plane and configured to create electrical impulses in response to the light at the common focal plane; and signal processing unit configured to process the electric impulses for displaying an image.

According to another aspect of the invention, there is provided a method including: imaging light in a wavelength range from about 1.25 to about 2.5 micrometers and light in a wavelength range from about 750 to about 950 micrometers at a common focal plane using a plurality of comprising at least a first lens element having an associated Abbe number $V_d$ of approximately about 83.79424 to 85.14576, a

TABLE 2

| Surface | Radius (mm) | Thickness (mm) | Lens Material | K | A | B | C | D |
|---|---|---|---|---|---|---|---|---|
| 320 | −48.65 | 7.5 | NFK51 | | | | | |
| 322 | −93.953 | 4.391167 | | | | | | |
| 324 | 46.717 | 20 | NLAK21 | | | | | |
| 326 | 30.48 | 25 | NFK51 | | | | | |
| 328 | 35.099 | 9.582538 | | | | | | |
| 330 | 1701.8 | 7.5 | NLAK21 | | | | | |
| 332 | 30.77 | 25.4 | NFK51 | | | | | |
| 334 | −42.333 | 0.1 | | | | | | |
| 336 | 27.82712 | 24.5 | BaF$_2$ | 0 | −1.57577E−06 | −3.10611E−10 | −7.43181E−12 | 1.35766E−14 |
| 338 | 298.11 | 10.454072 | | | | | | |
| 340 | infinity | 1.016 | ZnSe | | | | | |
| 342 | infinity | 22.986 | | | | | | |
| 344 | infinity | 1.016 | ZnSe | | | | | |
| 346 | infinity | 4.7 | | | | | | | second lens element having an associated Abbe number $V_d$ of about 59.6192 to 60.5808, and a third lens element made of Barium Fluoride; and displaying an image in response to the light at the focal plane.

While the foregoing is directed to embodiments of the present invention, other and further embodiments of the invention may be devised without departing from the basic scope. Various other configurations and arrangements of the disclosed embodiments will be apparent to those of ordinary skill in the art. Accordingly, the scope of the invention is determined by the claims that follow.

What is claimed is:

1. A lens system comprising:
a plurality of lenses comprising:
a first lens element having an associated Abbe number $V_d$ of about 83.79424 to 85.14576;
a second lens element having an associated Abbe number $V_d$ of about 59.6192 to 60.5808; and
a third lens element made of Barium Fluoride,
said plurality of lenses configured to simultaneously image light in a wavelength range from about 1.25 to about 2.5 micrometers and light in a wavelength range from about 750 to about 950 micrometers at a common focal plane.

2. The lens system of claim 1, wherein said first lens element exhibits a refractive index of approximately 1.48656 at a wavelength of 587.56 nm.

3. The lens system of claim 1, wherein said second lens element exhibits a refractive index of approximately 1.64049 at 587.56 nm.

4. The lens system of claim 1, wherein said third lens element has an index of refraction of in a range from 1.465871 to 1.470400 for wavelengths of light at or between approximately 1.6 to 0.8 micrometers.

5. The lens system of claim 1, wherein said third lens element has an associated Abbe number of approximately 103.2 for wavelengths of light between from 1.6 to 0.8 micrometers.

6. The lens system of claim 1, wherein said first and second lens elements are provided in at least one doublet configuration.

7. The lens system of claim 1, wherein said plurality of lenses further comprises:
an objective lens unit configured to focus light onto an intermediate plane; and
a relay lens unit configured to focus light from said intermediate plane to said common focal plane.

8. The lens system of claim 1, said system further comprising a dewar including a cold shield.

9. The lens system of claim 8, wherein said cold shield is configured to provide 100% cold shield efficiency.

10. A system comprising:
a plurality of lenses comprising at least a first lens element having an associated Abbe number $V_d$ of about 83.79424 to 85.14576, a second lens element having an associated Abbe number $V_d$ of about 59.6192 to 60.5808, and a third lens element made of Barium Fluoride, said plurality of lenses configured to simultaneously image light in a wavelength range from about 1.25 to about 2.5 micrometers and light in a wavelength range from about 750 to about 950 micrometers at a common focal plane;
a detector positioned at said common focal plane and configured to create electrical impulses in response to said light in said wavelength range from about 1.25 to about 2.5 micrometers and said light in said wavelength range from about 750 to about 950 micrometers; and
a signal processing unit configured to process said electric impulses for displaying an image.

11. The system of claim 10, wherein said first lens element exhibits a refractive index of approximately 1.48656 at a wavelength of 587.56 nm.

12. The system of claim 10, wherein said second lens element exhibits a refractive index of approximately 1.64049 at 587.56 nm.

13. The system of claim 10, wherein said third lens element has an index of refraction of in a range from 1.465871 to 1.470400 for wavelengths of light at or between approximately 1.6 to 0.8 micrometers.

14. The system of claim 10, wherein said third lens element has an associated Abbe number of approximately 103.2 for wavelengths of light between from 1.6 to 0.8 micrometers.

15. The system of claim 10, wherein said first and second lens elements are provided in at least one doublet configuration.

16. The system of claim 10, said system further comprising a dewar including a cold shield.

17. The system of claim 16, wherein said cold shield is configured to provide 100% cold shield efficiency.

18. A method comprising:
imaging light in a wavelength range from about 1.25 to about 2.5 micrometers and light in a wavelength range from about 750 to about 950 micrometers at a common focal plane using a plurality lenses of comprising at least a first lens element having an associated Abbe number $V_d$ of about 83.79424 to 85.14576, a second lens element having an associated Abbe number $V_d$ of about 59.6192 to 60.5808, and a third lens element made of Barium Fluoride; and
displaying an image in response to said light at said focal plane.

* * * * *